(No Model.) 2 Sheets—Sheet 2.

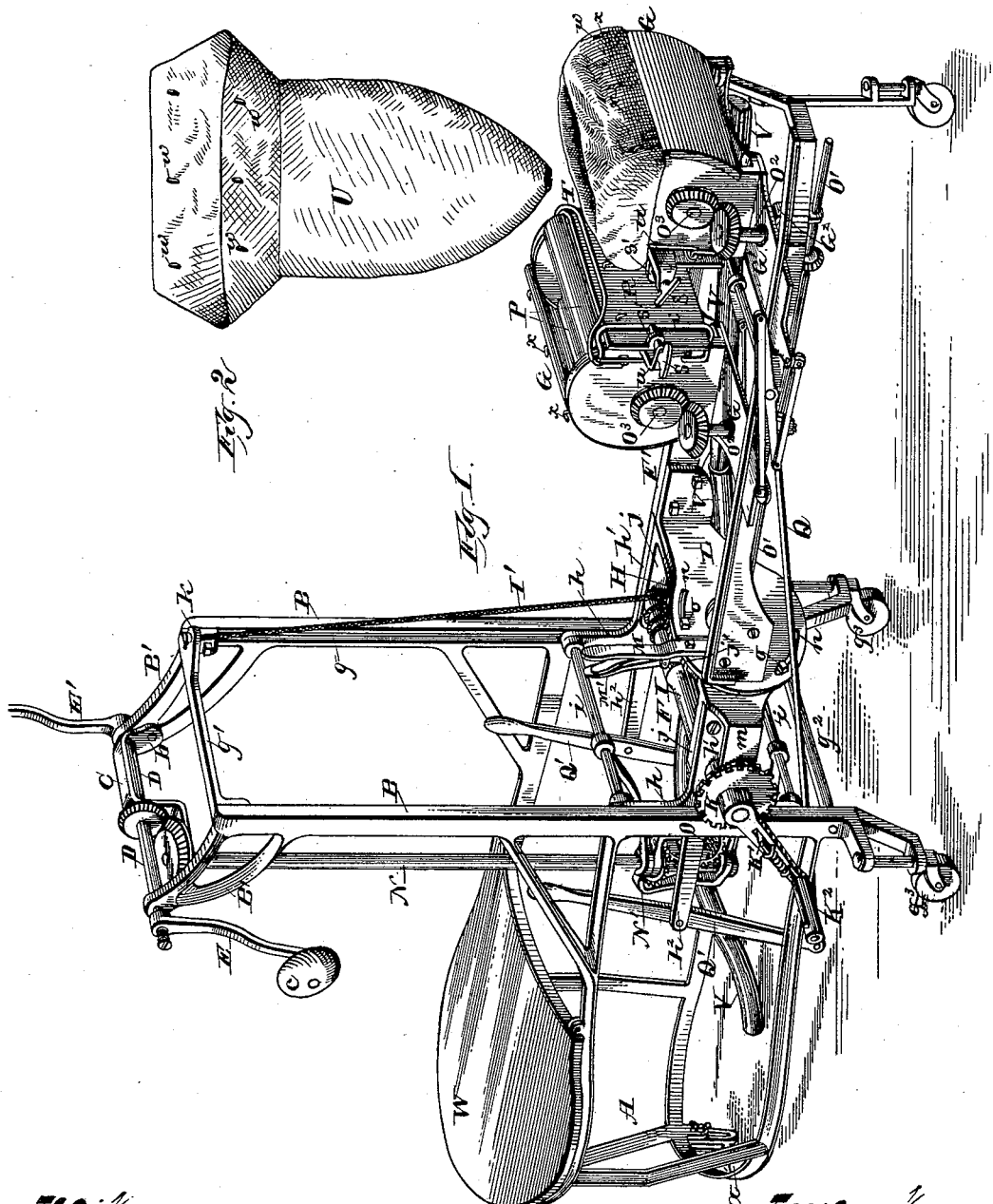

I. BEYER & A. E. ROHDE.
COW MILKING MACHINE.

No. 366,810. Patented July 19, 1887.

Witnesses:
E. G. Somers
N. E. Oliphant

Inventors
Ira Beyer
August E. Rohde
By Stout & Underwood
Attorneys.

United States Patent Office.

IRA BEYER AND AUGUST E. ROHDE, OF MISHICOT, WISCONSIN.

COW-MILKING MACHINE.

SPECIFICATION forming part of Letters Patent No. 366,810, dated July 19, 1887.

Application filed December 18, 1886. Serial No. 221,908. (No model.)

*To all whom it may concern:*

Be it known that we, IRA BEYER and AUGUST E. ROHDE, of Mishicot, in the county of Manitowoc, and in the State of Wisconsin, have invented certain new and useful Improvements in Cow-Milking Machines; and we do hereby declare that the following is a full, clear, and exact description thereof.

Our invention relates to cow-milkers, being an improvement on the machine set forth in our former patent, No. 347,558, dated August 17, 1886; and it consists in certain peculiarities of construction, to be hereinafter described with reference to the accompanying drawings, and subsequently claimed.

Figure 3:
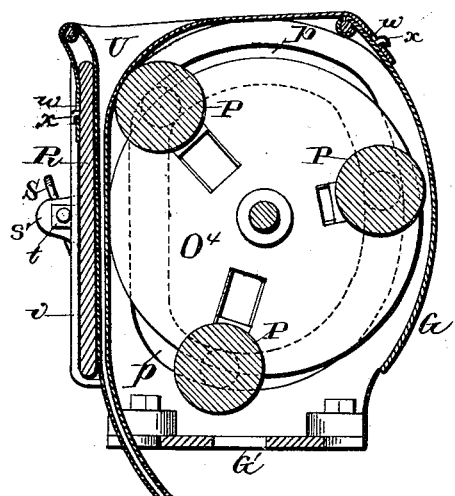
Figure 4:
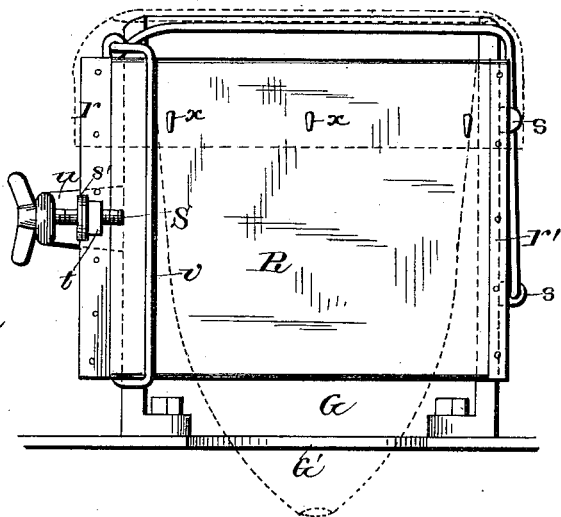
Figure 5:
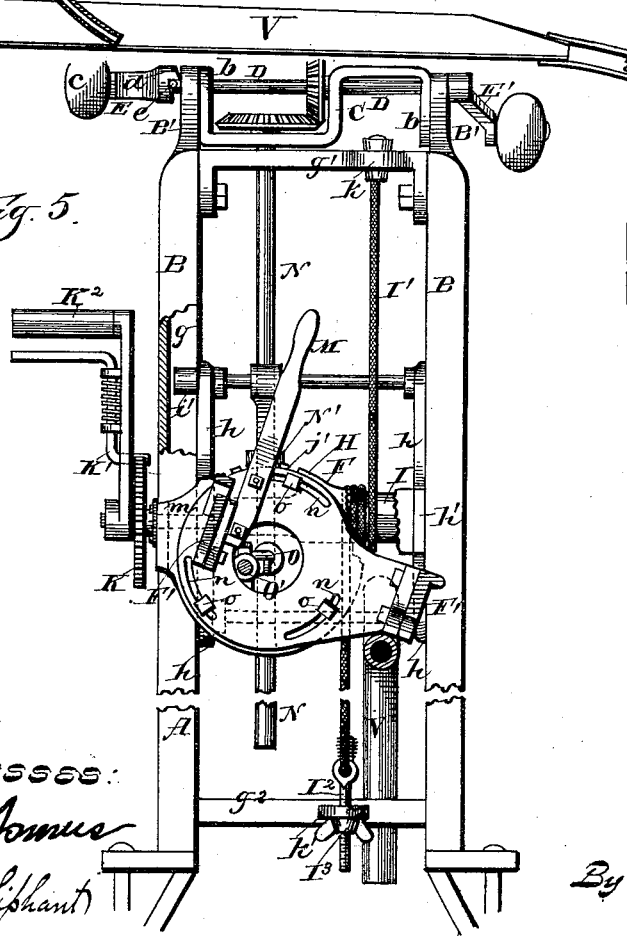
Figure 6:
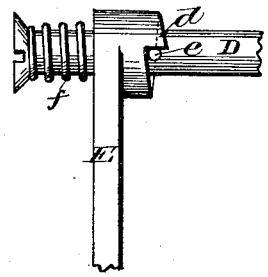

In the drawings, Figure 1 represents a perspective view of our improved machine; Fig. 2, a front view of a non-porous sack designed as an attachment to a milking-cylinder; Fig. 3, a vertical transverse section of a milking-cylinder; Fig. 4, a front view of the same; Fig. 5, a sectional view showing the means for adjusting the frame that carries the milking-cylinders, and Fig. 6 a detail view showing a portion of the drive-shaft and loose crank thereon.

Referring by letter to the drawings, A represents the main frame of our machine, in which the canting mechanism, vertical rack, and the tank described in our former patent are omitted, while at the same time the rear of this frame is provided with a vertically-adjustable pivot-wheel, $a$, that serves to regulate the elevation thereof.

The vertical standards B at the front end of the main frame are provided with bracket-extensions B', that, together with the ears $b$ of a transverse plate, C, uniting the extremities of these brackets, form bearings for a horizontal drive-shaft, D, provided at its ends with cranks E E'.

In our former patent both cranks were fast on the shaft, and it was found that the one on the right would come in the way of the operator when reaching forward to place the teats of a cow in the milking-cylinders or to adjust the frame carrying these cylinders.

To obviate the difficulty just described, we loosely fit the crank E to the drive-shaft D, so that when it is released by the operator the weight of its handle $e$ will cause the same to assume a position parallel with the adjacent vertical standard B of the main frame, as shown by Fig. 1. The end of the crank E that fits upon the drive-shaft D has its inner face provided with a cam-shaped clutch, $d$, to engage a stud, $e$, projecting from said shaft. The crank E is held in contact with the stud $e$ of the drive-shaft by means of a spiral spring, $f$, arranged on said shaft to exert its force against the outer side of said crank. When both cranks E E' are operated, the clutch $d$ of the former engages the stud $e$ of the drive-shaft and aids to rotate this latter part; but the moment this crank E is released it will fall back to the vertical position above described, the rotation of said shaft being continued with the crank E'. The crank E being loose on the drive-shaft and its clutch $d$ cam-faced, the stud $e$ on said shaft during the rotation thereof will push this crank out of the way, while the spring $f$ will immediately force it back to its normal position after said stud has passed the highest point of the clutch.

Like in our former patent, the vertical standards B of the main frame have their inner faces provided with grooves $g$, and in the present instance these standards are united by top and bottom cross-pieces, $g'$ $g^2$, pivot-wheels $g^3$, similar to those in said patent, being also secured to the lower ends of the respective standards.

In our former patent the vertically-adjustable supporting-frame for the milking-cylinders G was continuous; but in the present instance we make the same in two sections, F F', the rear section consisting of vertical side pieces, $h$, united by transverse rods $i$, these latter carrying anti-friction rollers $i'$, that operate in the grooves $g$ of the main-frame standards B. The side pieces, $h$, of the frame-section F are provided with ears $h'$, to which are bolted the ears $j$ of a circular front plate, H, that has a central opening and a series of serrations, $j'$, on its upper edge.

Journaled in the united ears $h'$ $j$ of the side pieces, $h$, and front plate, H, of the frame-section F is a spindle, I, on which is coiled a wire cable, I', that has its upper end secured to a lug, $k$, on the top cross-piece, $g'$, uniting the main-frame standards B, and the lower end of this cable is connected to a screw-threaded rod, I², that passes through a lug, $k'$, on the bottom cross-piece, $g^2$. On this screw-threaded rod operates a thumb-nut, I³, by which said rod is adjusted to take up the slack occasioned by the stretch of the cable. To a journal of the spindle I is rigidly secured a crank, K², provided with a spring-dog, K', that engages a suitably-arranged rack-disk, K, adjacent to a right-angular extension, m, of the front plate, H. By this construction and arrangement of parts the sectional frame carrying the milking-cylinders G may be vertically adjusted and held at the desired elevation in the most simple and inexpensive manner.

The section F' of the vertically-adjustable frame is provided at its rear end with a plate, L, corresponding in shape to that on the front of the frame-section F, and said rear plate has a central opening and a series of arc-shaped slots, n, near its periphery. These arc-shaped slots n in the rear plate, L, of the frame-section F' engage screw-bolts o, that project from the front plate, H, of the frame-section F and serve to retain the respective plates in their opposing relation.

Rigidly connected to the rear plate, L, of the frame-section F' is a handle, M, to which is pivotally connected a spring-dog, M', arranged to engage the serrations j' in the front plate, H, of the frame-section F.

By the construction and arrangement of the respective plates H L of the frame-sections F F' in connection with the handle and dog M M', the latter section, which has the milking-cylinders G mounted thereon, can be readily canted toward the left and held in its adjusted position.

As in our former patent, the drive-shaft D is bevel-geared to a vertical shaft, N, that has its bearings in the transverse plate C, and a bracket, N', secured to the transverse rods i, that unite the vertical side pieces, h, of the frame-section F, said shaft being so constructed as that the bracket may slide freely thereon when the crank K² is operated to vertically adjust the frame that carries the milking-cylinders.

The vertical shaft N is in turn bevel-geared to a horizontal shaft, O, that is universally jointed to another horizontal shaft, O', that passes through the central openings in the plates H L and has its bearings in suitable hangers, G², depending from the base-plates G' of the milking-cylinders G, said base-plates being operatively arranged in the section F' of the vertically-adjustable frame, substantially as described in our former patent. The horizontal shaft O' is geared to short vertical shafts O², journaled in the hangers G², depending from the base-plates G' of the cylinders, and the vertical shafts are in turn geared to the shafts O³, that have their bearings in the heads of said cylinders and carry slotted plates O⁴, to which are operatively connected the milking-rolls P, the journals of these rolls being provided with anti-friction wheels (shown by dotted lines, Fig. 3) that operate in elliptical tracks p on the inner faces of the cylinder-heads.

The general arrangement and gearing of the several shafts above mentioned are similar to that described in our former patent, and in the main the milking-cylinders are likewise similar to those in said patent. The base-plates G' of the milking-cylinders are adjusted by means of a link-and-arm mechanism like that described in our former patent, connected by rods Q with vertical levers Q', pivotally connected to arms h², extended rearward from the side pieces, h, of the adjustable frame-section F, said levers being within easy reach of the operator.

Instead of the pressure-plates described in our former patent in connection with the milking-cylinders G, we use cushions R, that preferably are made from rubber cloth stuffed with some pliable material.

The respective cushions have their vertical edges bound with metal plates r r', the ones r' being provided with eyes that engage lugs s on the cylinder-heads at the left side of the machine, and the ones r with a perforated angle-piece, s', through which passes a set-screw, S, provided with a jam-nut, t, said set-screw having its bearing in a bracket, u, projecting from the right-hand head of the adjacent cylinder.

By operating the set-screw the tension of the cushions can be readily regulated according to the requirements of the work.

A spring-wire, v, is secured to the right-hand cylinder-heads to form guides for the cushions R, and at the same time hold the latter at all times close against the adjacent edges of said heads, to prevent the teats of cows from being caught and pinched.

Suitably joined to the milking-cylinders are bail-pieces T, over which and the top of the respective cylinders it is designed to stretch the mouth of a sack, U, made of non-porous material, such as tarpaulin, rubber cloth, or oil-silk. The sacks at their mouths are provided with eyes w, that engage hooks x on the cylinders, and pressure-cushions, while the main portion of these sacks is passed down between said cushions and the milking-rolls P, to discharge into a conduit, V, that leads to a bucket or other receptacle, intended to be placed beneath the seat W on the main frame. By the employment of these sacks the milking-rolls and insides of the cylinders are kept from contact with the milk as it is drawn from the cow, while at the same time after the milking has been completed it is only necessary to wash out these bags, instead of having to thus cleanse the whole interior of said cylinders.

By the construction above described we have simplified and cheapened our machine, and at the same time rendered it more readily adjustable to inequalities of the surface on which it may rest, as well as to cows of various heights.

Having thus fully described our invention, what we claim as new, and desire to secure by Letters Patent, is—

1. In a cow-milker, the combination of a main frame, a vertically-adjustable auxiliary frame composed of two sections, one of which is loosely connected to the main frame and provided with a serrated front plate, and the other of these sections provided with a rear plate that corresponds with the front plate of the former section and has a series of arc-shaped slots, suitable bolts uniting said sections, a milking apparatus arranged on the front section, and a lever rigidly connected to the slotted plate and provided with a spring-dog to engage the adjacent serrated plate, substantially as set forth.

2. In a cow-milker, the combination of a main frame having vertical front standards united by top and bottom cross-pieces, an auxiliary frame loosely joined to said standards and having a radially-adjustable section that carries the milking apparatus, a spindle journaled in the auxiliary frame, a cable wound on the spindle and connected at its ends to said cross-pieces, and suitable means for operating and locking said spindle, substantially as set forth.

3. In a cow-milker, the combination of a main frame having vertical front standards united by top and bottom cross-pieces, an auxiliary frame loosely joined to said standards and having a radially-adjustable section that carries the milking apparatus, a spindle journaled in the auxiliary frame, a cable wound on the spindle and connected at its upper end to the top cross-piece of the main frame, an eyebolt operative in the bottom cross-piece of said main frame and connected to the lower end of the cable, and suitable means for operating and locking said spindle, substantially as and for the purpose set forth.

4. In a cow-milking machine, the main frame thereof provided with a series of pivot-wheels, the rear one of which is vertically adjustable, a vertically-adjustable frame auxiliary to the main one and having a radially-adjustable section that carries the milking apparatus, and a guide-wheel connected to the front end of said auxiliary frame, substantially as set forth.

5. In a cow-milking machine, the combination of the milking-cylinders, flexible pressure-cushions stuffed with pliable material and each having an end thereof secured to a milking-cylinder, and a suitable mechanism for regulating the tension of said cushions, as set forth.

6. In a cow-milker, each milking-cylinder having one head thereof provided with ears and the other with a projecting bracket, in combination with a pressure-cushion having one of its vertical edges provided with eyes to engage said ears and the other with an angle-piece, and a set-screw arranged to engage said bracket and angle-piece, substantially as set forth.

7. In a cow-milking machine, the combination of the milking-cylinders, flexible pressure-cushions stuffed with pliable material and each having an end thereof secured to a milking-cylinder, a suitable mechanism for regulating the tension of said cushions, and spring-wires bent to form guides for the cushions and arranged to hold the latter close against the adjacent edges of the cylinder-heads, as set forth.

8. In a cow-milker, the combination, with the milking-cylinder provided with pressure-cushions forming part thereof, and a series of rolls revoluble in the cylinders, of non-porous sacks having their mouths stretched over the tops of said cylinders and their main portion extended down therein between the cushion and rolls, and a conduit arranged to receive the milk from said sacks, substantially as and for the purpose set forth.

9. In a cow-milker, the combination, with the milking cylinders and rolls, of suitable pressure plates or cushions operatively connected to the cylinders, and non-porous sacks having their mouths stretched over the tops of said cylinders and their main portion extended down between the rolls and pressure plates or cushions to discharge into a suitable conduit, substantially as set forth.

10. In a cow-milker, the combination of the milking-cylinders provided with hooks, the pressure plates or cushions, also provided with hooks, milking-rolls operative in the cylinders, and non-porous sacks having their mouths provided with eyes to engage said hooks and their main portion extended down between the pressure plates or cushions and milking-rolls to discharge into a suitable conduit, substantially as set forth.

In testimony that we claim the foregoing we have hereunto set our hands, at Mishicot, in the county of Manitowoc and State of Wisconsin, in the presence of two witnesses.

IRA BEYER.
AUGUST E. ROHDE.

Witnesses:
 B. F. RICHTER,
 L. C. WILKENS.